United States Patent [19]

Semenza

[11] Patent Number: 5,415,551

[45] Date of Patent: May 16, 1995

[54] AIRCRAFT FIREFIGHTER TRAINER

[75] Inventor: Dirk A. Semenza, Great Falls, Mont.

[73] Assignee: R², Great Falls, Mont.

[21] Appl. No.: 129,245

[22] Filed: Sep. 28, 1993

Related U.S. Application Data

[63] Continuation-in-part of Ser. No. 996,652, Dec. 24, 1992, abandoned.

[51] Int. Cl.⁶ .............................................. G09B 19/00
[52] U.S. Cl. .................................................. 434/226
[58] Field of Search ................... 434/226, 219, 37, 30, 434/29

[56] References Cited

U.S. PATENT DOCUMENTS

| | | | |
|---|---|---|---|
| H1,134 | 2/1993 | Meadows et al. | 434/226 |
| 3,675,342 | 7/1972 | Wolff | 434/226 |
| 4,001,949 | 1/1977 | Francis | 434/226 |
| 5,181,851 | 1/1993 | Layton et al. | 434/226 |

*Primary Examiner*—Gene Mancene
*Assistant Examiner*—Jeffrey A. Smith

[57] ABSTRACT

A mobile firefighter trainer and method are disclosed for use in training and evaluating firefighters in the extinguishment of simulated aircraft fuel fires. The trainer include a trailer body in the shape of a simulated aircraft, a fuel distribution and burner system, and a central control means connected to the fuel distribution and burner system. The trainer and method allow for use of actual fire in a predetermined manner which fire is controlled and environmentally safe.

26 Claims, 5 Drawing Sheets

AIRCRAFT FIREFIGHTER TRAINER

This application is a continuation-in-part of application Ser. No. 996,652, filed Dec. 24, 1992, and now abandoned.

The invention relates to a live flame mobile firefighter trainer and method, and in particular to an aircraft fuel firefighter trainer.

Conventional aircraft fuel firefighter trainers include burn area facilities having a pit structure holding liquid aviation jet fuel or other liquid fuel, or means for supplying fuel to the pit structure, and a simulated aircraft structure disposed in or near the pit structure. Other aircraft fuel firefighter training facilities include a pit structure, a fuel distribution system, a burner control system connected to a computerized operator control panel, and an extinguishing agent detection system connected to the operator control panel. The most common aircraft fuel firefighter training facilities are generally permanent structures with means for generating flames and smoke to provide an environment for training firefighters. Conventional trainers generally do not provide for realistic aircraft internal compartmentalization needed to allow training and evaluation of internal aircraft fires. Computerized simulation has been attempted, but computer simulation and evaluation can be affected by the computer wrongfully interpreting the application of fire extinguishing agents leaving the trainee not fully prepared to take efficient and effective action to quell a fire most expeditiously.

Generally, conventional aircraft fuel firefighter training techniques have failed to prepare the trainee to take efficient and effective action to quell an actual fire most expeditiously in a variety of physical settings. Accordingly, the need for realism and responsiveness afforded by the present invention and its mobility has been long felt by those in the training of aircraft fuel firefighters.

Taken as a whole, conventional techniques and trainers have failed to prepare the trainee for what is to be expected from an aircraft fuel fire. Time equals loss and possible injury in aircraft fuel fire situations. Experience increases efficiency and reduces time of exposure. Accordingly, the need for the realism, responsiveness and practical experience afforded by the present invention has been long felt by those in the training of aircraft firefighters.

In view of the evergrowing emphasis on ecology and concern over energy conservation, there is also a clear need for a realistic aircraft fire trainer and method which does not waste fuel nor contribute to environmental pollution. Conventional trainers have caused air pollution by the burning of aviation jet fuel. Conventional trainers can cause ground pollution by the runoff of extinguishing agents and unburned fuel. Conventional aircraft fuel firefighting facilities are generally stationary, relatively expensive and available only to large airports.

SUMMARY OF THE INVENTION

Accordingly, it is an object of the present invention to provide a firefighting training device and method that allows for a close to real aircraft fuel fire for training and evaluation purposes.

It is a further object of the present invention to provide a training and evaluation device and method that allows for a close to real aircraft fuel fire in differing situations that can be safely controlled and quickly and efficiently terminated on demand.

It is a still further object of the present invention to provide a firefighting training device and method that allows for a close to real aircraft fuel fire for training and evaluation purposes that does not introduce harmful pollutants into the environment.

It is a still further object of the present invention to provide a controlled emergency environment which responds realistically to techniques applied by firefighters against close to real aircraft fuel fires.

It is a still further object of the present invention to provide a realistic appearance of the fire and the simulated aircraft in order to acquaint the trainee, as nearly as possible in a simulated environment, with the factors that will be or are likely to be encountered in combating an aircraft fuel fire.

These and other objects and many attendant advantages of the present invention are obtained where a new and improved aircraft fuel firefighter trainer and method are provided which are relatively inexpensive, mobile, and safe while providing a realistic environment for the training and evaluation of firefighters. The present invention provides a new and improved aircraft firefighter trainer and method in the form of a trailer type vehicle which is mobile and may be transported from one physical location to another at an airport or used at scattered airports. The trainer includes a substantially rectangular multiple axle trailer body in the shape of a simulated aircraft, a fuel distribution and burner system, and a central control means connected to the fuel distribution and burner system. A towing unit is utilized to transport the trailer, house the central control means, and store accoutrements.

The substantially rectangular multiple axle trailer body in the shape of a simulated aircraft includes a metal frame having a metal housing in the shape of a simulated aircraft fuselage and a plurality of axles and wheels. Partitions divide the interior of the metal housing into compartments, including a cockpit compartment, a passenger compartment, and a cargo compartment. Also included in the metal housing are standard aircraft entrance/exit doors, standard aircraft emergency exits and exit doors, standard aircraft windows and window frames, a cargo door located in the aft, removable aircraft seats attached in standard aircraft passenger compartment row configuration in the interior of the passenger compartment, a standard aircraft passenger compartment width aisle between the rows of seats, and attached aircraft seats in the cockpit compartment. Also included are triple-hinged wings attached to the exterior port and starboard sides of the metal housing and a retractable vertical fin tail attached to the aft of the metal housing. Mock jet aircraft engines are provided, one permanently mounted on each side of the vertical fin tail and four removably mounted on the triple-hinged wings. The metal housing also has a main extinguishing agent waste drain.

The fuel distribution and burner system provides liquid propane to burner assemblies for actual fire in a controlled manner. An electrical distribution system controlled from the central control means housed on the towing unit regulates the fuel distribution and burner system, a deadman safety system, a blowdown system, and an environmentally safe smoke generating system. The electrical distribution system provides electricity to ignite the burner assemblies as well as regulate and operate the various valves and safety mechanisms in the trainer.

The trainer provides a method for fire simulation response with or without live fire. Trainer operating and training parameters are designed and prepared having fire location, both on the trainer and at the site, fire growth and fire spread rate and extinguishment difficulty level predetermined. By using clean burning propane in place of jet fuel, the problem of air and ground pollution from fuel are minimized. The trainer permits the evaluation of trainees' performance by monitoring the trainees' extinguishment efforts.

An advantage of the present invention is that it is a potentially non-polluting device. Another advantage is that the present invention is mobile and relatively inexpensive compared to other aircraft crash fuel fire trainers. Another advantage is that the present invention is fully adjustable and immediately responsive. The present invention has the capability of being interrupted on command with resumption after detailed corrective instruction or adaptive training has been completed. The monitoring of the trainee's performance is accomplished through the use of spotters from a remote location.

The novel features which are believed to be characteristics of the invention, both as to its organization and method of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Referring now descriptively to the drawings, in which similar reference characters denote similar elements throughout the several views, the mobile firefighter trainer and method provide for a new and improved aircraft firefighter trainer which may be transported from one location to another to train and evaluate the firefighter personnel at different locations in an airport or at scattered airports. The trainer comprises a substantially rectangular multiple axle trailer body 11 in the shape of a simulated aircraft, a fuel distribution and burner system, and a central control means connected to the fuel distribution and burner system. A towing unit 14 is utilized, which towing unit 14 may be any self-propelled vehicle capable of physically moving the trailer 11, providing for storage capacity, and supporting the central control means. The towing unit 14 also houses a liquid propane tank 67, a liquid propane pump 68, and a $CO_2$ storage tank 74.

Figure 1:
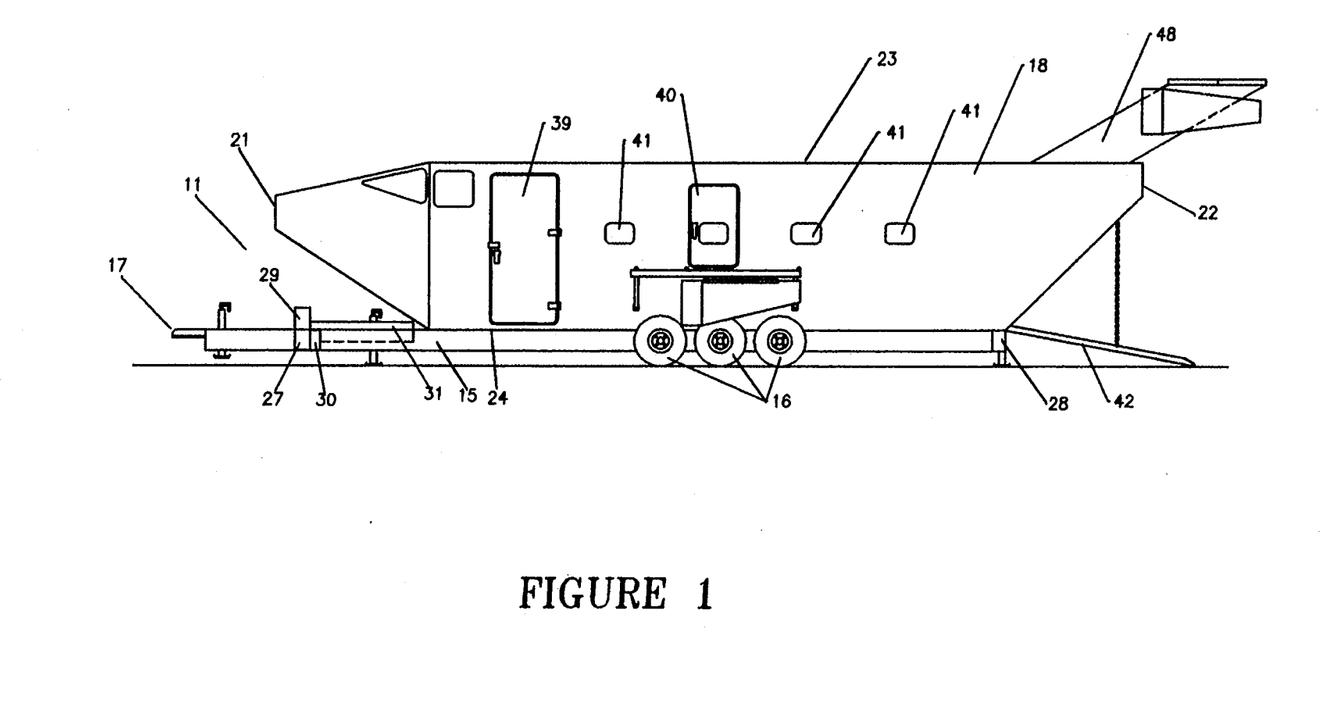
FIG. 1 is a perspective view of the trailer body in the shape of a simulated aircraft of a mobile firefighter trainer.

As shown more clearly in FIG. 1, the substantially rectangular multiple axle trailer 11 in the shape of a simulated aircraft includes a metal frame 15 having a plurality of axles and wheels 16 and a hitch 17. Attached to the metal frame 15 is a metal housing 18 in the shape of a simulated aircraft fuselage having an interior 19, an exterior 20, a front 21, an aft 22, a top 23, a bottom 24, a port side 25, and a starboard side 26. Included in the metal frame 15 are a quick coupler 27 in the hitch 17 for a liquid propane source, a quick coupler 28 on the aft 22 for a liquid propane source, a quick coupler 29 in the hitch 17 for an electrical source, and a quick coupler 30 in the hitch 17 for a $CO_2$ source, as well as an insulated electrical facility 31 housing relays, transformers, and wiring of an electrical distribution system and a smoke generating system.

Figure 2:
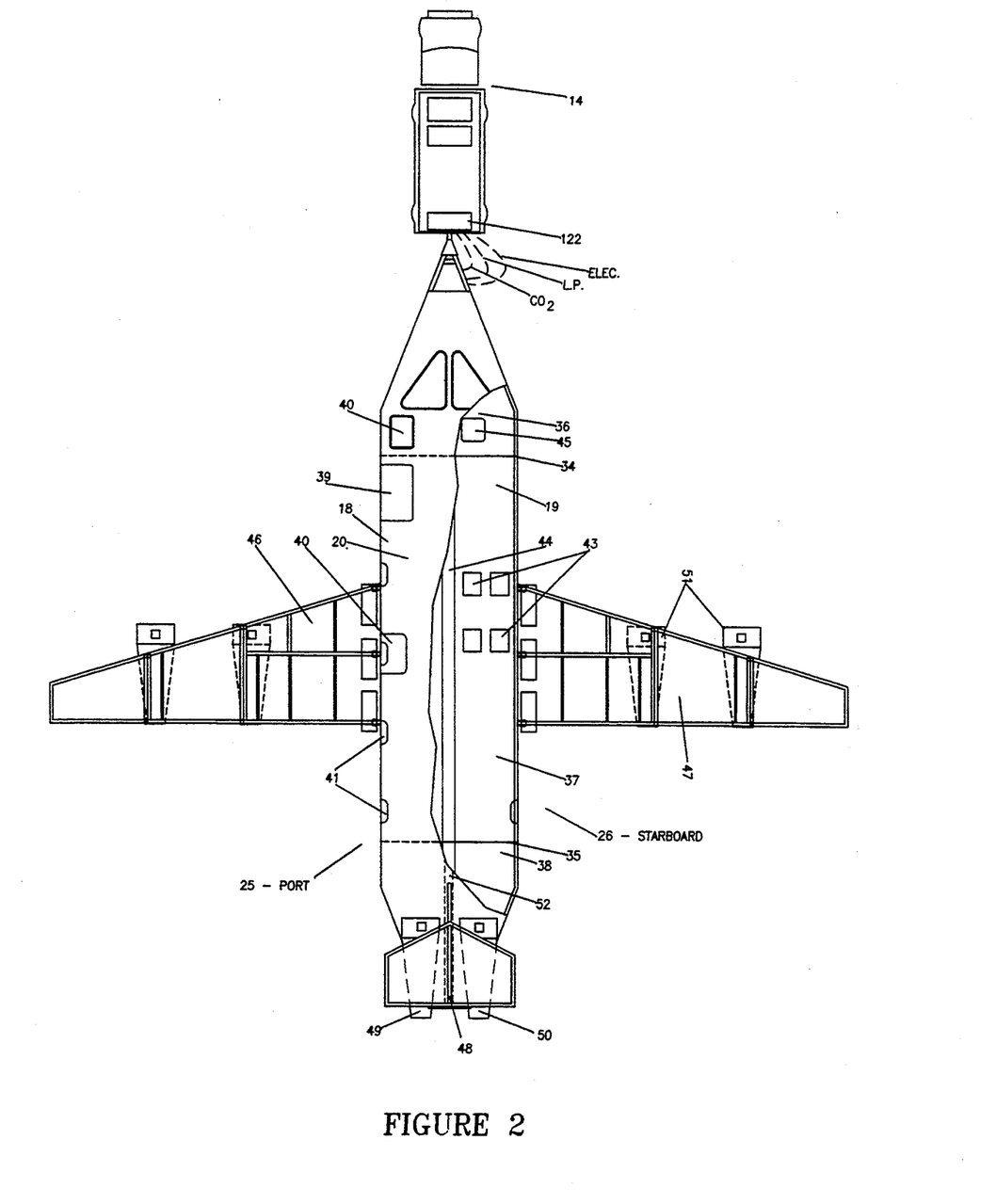
FIG. 2 is a perspective overhead view of the trailer showing attachment to a towing unit.

FIG. 2 shows that the metal housing 18 has a plurality of two partitions 34,35 dividing the interior 19 into a plurality of three simulated aircraft compartments, including a cockpit compartment 36, a passenger compartment 37, and a cargo compartment 38. The metal housing 18 has a plurality of two standard aircraft entrance/exit doors 39, a plurality of four standard aircraft emergency exits /exit doors 40, a plurality of ten standard aircraft windows/window frames 41, a cargo door 42 located in the aft 22, a plurality of eight removable aircraft seats 43 attached in standard aircraft passenger compartment row configuration in the passenger compartment 37 with a standard aircraft passenger compartment width aisle 44 between the rows of seats when the seats are attached in the passenger compartment 37, and a plurality of two standard aircraft cockpit seats 45 permanently attached in the cockpit compartment 36.

The metal housing 18 has a triple-hinged wing 46 attached to the exterior port side, a triple-hinged wing 47 attached to the exterior starboard side, and a retractable vertical fin tail 48 attached to the aft 22 in such manner that the tail 48 can be raised and lowered by a hydraulic ram from inside the cargo compartment 38. The tail 48 has a plurality of two mock jet aircraft engines permanently attached, one mock jet aircraft engine 49 on the port side, and one mock jet aircraft engine 50 on the starboard side. A plurality of four mock aircraft jet engines 51 are removably mountable on the triple-hinged wings 46,47, two each per wing. The metal housing 18 also has a main extinguishing agent waste drain 52.

Figure 3:
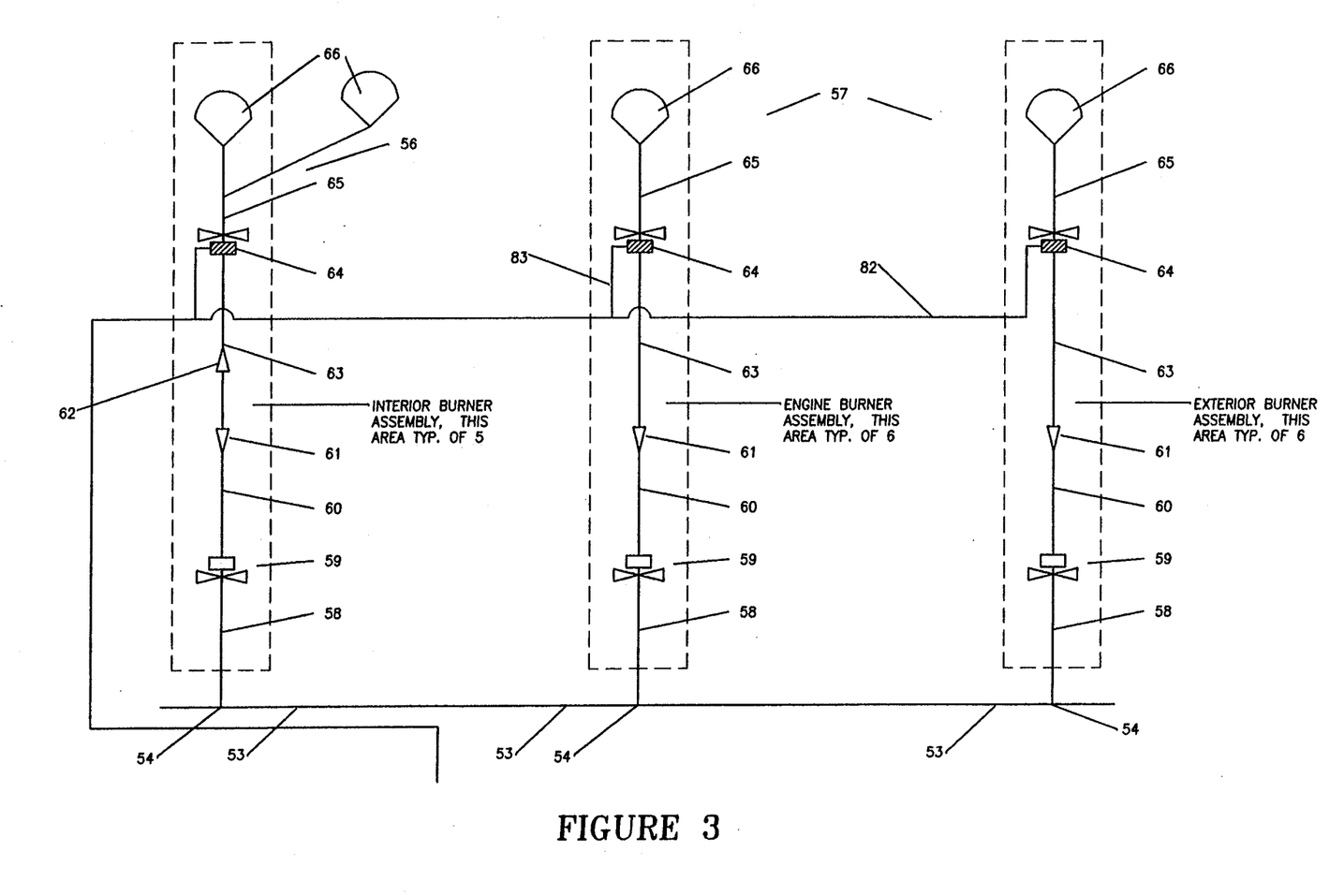
FIG. 3 is a schematic diagram of the fuel distribution and burner system.

As shown more clearly in FIG. 3, a fuel distribution and burner system is included in the trailer 11. The fuel distribution and burner system includes the plurality of two liquid propane quick couplers 27,28 attached to the metal frame 15, one in the hitch 17 and one on the aft 22, which receive pressurized liquid propane from the towing unit 14. A liquid propane manifold pipe 53 runs the length of the metal housing 18 from front 21 to aft 22 on the bottom 24 exterior 20 of the metal housing 18. A plurality of twenty-one T-joints 54 are attached to the manifold pipe 53 along the length of the manifold pipe 53. A plurality of seventeen burner assemblies, five interior 56 and twelve exterior and mock jet engine 57, are attached to the T-joints 54, which burner assemblies 56,57 are disbursed throughout the metal housing 18 and in the mock jet engines 49,50,51. The manifold pipe 53 maintains a constant liquid propane pressure for all of the burner assemblies 56,57. The burner assemblies 56,57 are of two configurations, one configuration for the five burner assemblies 56 located in the interior 19 of the metal housing 18 and one configuration for the twelve burner assemblies 57 located on the exterior 20 of the metal housing 18 and in the mock jet engines 49,50,51.

The five burner assemblies 56 located in the interior 19 of the metal housing 18 in the cockpit compartment 36, the passenger compartment 37, and the cargo compartment 38 comprise a pipe 58 attached to a T-joint 54, which pipe 58 runs and attaches to an input port of a servo valve 59, a pipe 60 which attaches to an output port of the servo valve 59 and runs and attaches to an input port of a pressure transmitter 61. A pipe 63 attaches to an output port of the pressure transmitter 61 and runs and attaches to an input port of a rack-and-pinion valve 64, and a pipe 65 runs from an output port of the rack-and-pinion valve 64 and attaches to an input port of a burner 66. Attached to the pipe 63 between the pressure transmitter 61 and the rack-and-pinion valve 64 is a pressure limiter 62 which functions to allow a maximum of 25 lbs./sq. in. liquid propane pressure for the interior burner assemblies 56. The burner assembly in the cockpit compartment 36 includes a complete interior configuration burner assembly 56. The burner assemblies in the passenger compartment 37 and cargo compartment 38 have paired burners 66, one on each the port side 25 and the starboard side 26, for receiving liquid propane by means of branching of the pipe 65 from the output port of the rack-and-pinion valve 64 to the input ports of the two paired burners 66. In one embodiment, the pipes 58,60,63,65 from the T-joint 54 to the burner 66 comprise ¼" sch. 80 pipe.

The twelve burner assemblies 57 located on the exterior 20 of the metal housing 18 and in the mock jet engines 49,50,51 comprise a pipe 58 attached to the T-joint 54, which pipe 58 runs and attaches to an input port of a servo valve 59, a pipe 60 which attaches to an output port of the servo valve 59 and runs and attaches to an input port of a pressure transmitter 61. A pipe 63 attaches to an output port of the pressure transmitter 61 and runs and attaches to an input port of a rack-and-pinion valve 64, and a pipe 65 runs from an output port of the rack-and-pinion valve 64 and attaches to an input port of a burner 66. In one embodiment, the pipes 58,60,63,65 from the T-joint 54 to the engine burners 66 comprise ½ "sch. 80 pipe. In one embodiment, the pipes 58,60,63,65 from the T-joint 54 to the exterior burners 66 comprise ¾" sch. 80 pipe.

Figure 4:
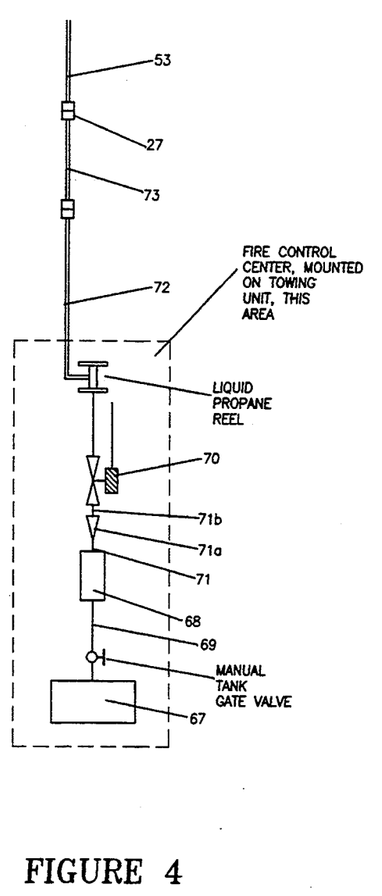
FIG. 4 is a schematic diagram of the liquid propane supply for the fuel distribution and burner system from the towing unit to the trailer.

FIG. 4 more clearly shows that liquid propane is stored and provided to the fuel distribution and burner system by means of a 500 gallon liquid propane tank 67 mounted on the towing unit 14. The liquid propane tank 67 is connected to an input port of a liquid propane pump 68 by means of a pipe 69. An output port of the liquid propane pump 68 is connected to an input port of a pressure transmitter 71a by a pipe 71. An output port of the pressure transmitter 71a is attached to an input port of a rack-and-pinion valve 70 by means of a pipe 71b. An output port of the rack-and-pinion valve 70 is connected to the metal housing 18 by means of a high pressure hose 72 which is connected to a 20' length of pipe 73, which pipe 73 is connected directly to the metal housing 18 through either liquid propane quick coupler 27 in the hitch or the liquid propane quick coupler 28 on the aft. In one embodiment, the pipe 69 connecting the liquid propane tank 67 to the liquid propane pump 68 is a 1¼ "sch. 80 pipe. In one embodiment, the pipes 71,73 connecting the liquid propane pump 68 and the rack-and-pinion valve 70 and the high pressure hose 72 and the quick couplers 27,28 is a 1" sch. 80 pipe. In one embodiment, the high pressure hose 72 is a 1" LPG 300 psi high pressure hose.

Figure 5:
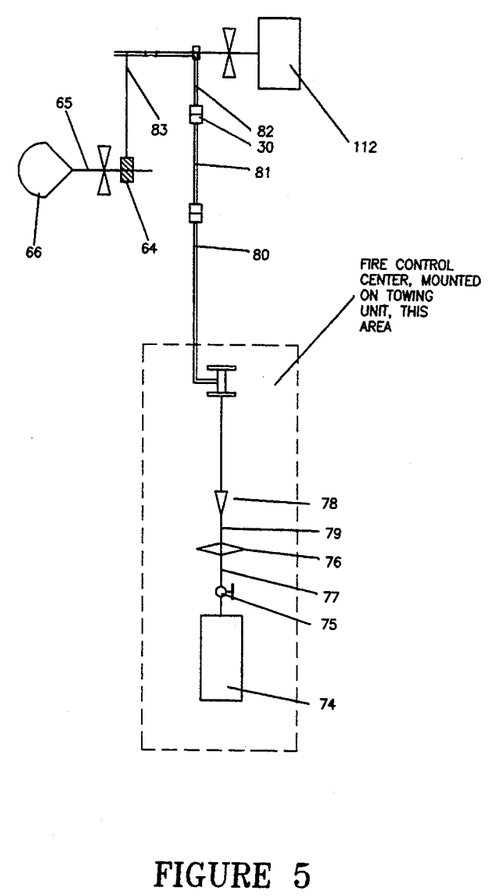
FIG. 5 is a schematic diagram of the $CO_2$ system from the towing unit to the trailer, including the smoke generating means.

FIG. 5 more clearly shows that attached to the rack-and-pinion valve 64 of each burner assembly 56,57 is a pressurized supply of CO2 gas, which pressurized CO2 gas drives the rack-and-pinion valve 64 to allow the passage of liquid propane when fire is desired at that particular burner assembly, and the cessation of which pressurized CO2 gas causes the rack-and-pinion valve 64 to immediately close stopping the flow of liquid propane to the burner 66 and thus the fire. The CO2 gas is supplied by a pressurized CO2 gas storage tank 74 located distant from the trailer 11 and a regulated supply line which maintains a constant CO2 gas pressure to the CO2 quick coupler 30 for disbursement throughout the trailer 11, which disbursement includes the rack-and-pinion valves 64 on the burner assemblies 56,57, and a rack-and-pinion valve in the smoke generating system. The regulated supply line also provides CO2 gas to the rack-and-pinion valve 70 located on the towing unit 14. In the regulated supply line the CO2 gas storage tank 74 is connected to an input port of a double stage high pressure regulator 76 by a pipe 77 through a manual gate valve 75. An output port of the double stage high pressure regulator 76 is connected to an input port of a high pressure transmitter 78 by a pipe 79. An output port of the high pressure transmitter 78 is connected to the trailer 11 by a high pressure hose 80 which is connected to a 20' length of pipe 81, which pipe 81 is connected directly to the trailer 11 by the CO2 quick coupler 30. A CO2 manifold 82 runs the length of the trailer 11 from the CO2 quick coupler 30 and has T-joints and piping 83 running from the CO2 manifold 82 to each rack-and-pinion valve 64 on the burner assemblies 56,57, and the smoke generating system. In one embodiment, the pipes 77,79,81 comprise 3/8" sch. 80 pipes.

Figure 6:
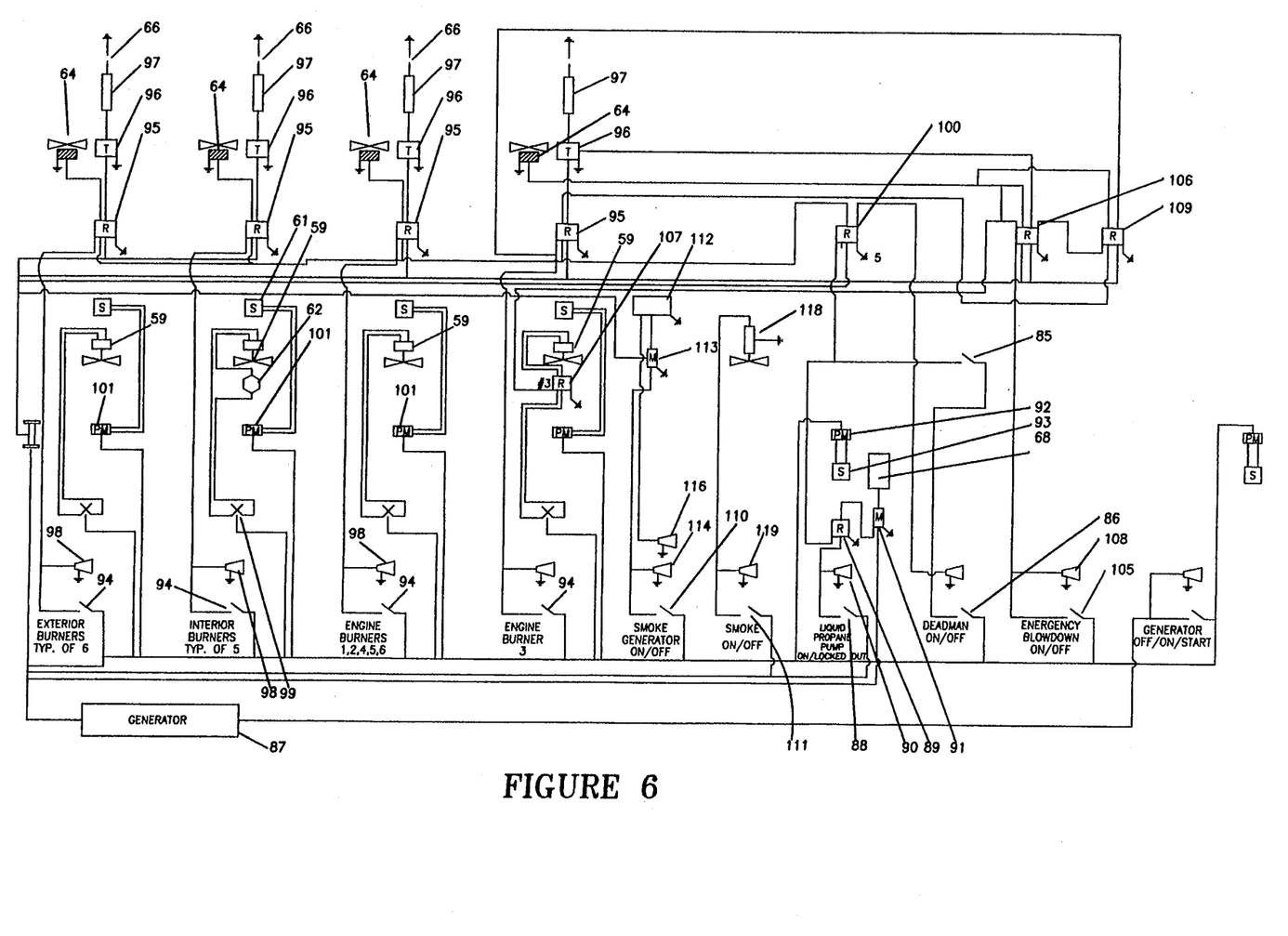
FIG. 6 is a schematic of the electrical distribution system of the fuel distribution and burner system of FIG. 3.

FIG. 6 more clearly shows an electrical distribution system controlled from the central control means housed on the towing unit which attaches to and regulates the fuel distribution and burner system, a deadman safety system, a blowdown system, and an environmentally safe smoke generating system. The electrical distribution system provides electricity to ignite the burners 66, to regulate and operate the servo valves 59 and the rack-and-pinion valves 64,70 on the fuel distribution and burner system, the CO2 supply, the smoke generating system, the blowdown system, the deadman system, and provides feedback to the central control means. The electrical distribution system comprises the insulated electrical facility 31 attached to the metal frame 15 and the components housed therein, the electrical distribution wiring, transmitters, and the igniters of the burners. The insulated electrical facility 31 houses relays, transformers and wiring for distribution of electricity throughout the trailer 11. The electrical distribution system is comprised of three configurations, one configuration for each of the five interior burner assemblies 56, one configuration for each of the twelve exterior and mock jet engine burner assemblies 57, and one configuration for a blowdown system in the burner assembly of mock jet engine number three, the port side tail mock jet engine 49.

The electrical distribution system configuration for all of the burner assemblies 56,57 includes a deadman system having a pull-type switch 85 located in the metal housing and a deadman switch 86 located in the central control means, which two switches immediately shut off the fuel distribution and burner system, and which must be appropriately configured for the fuel distribution and burner system to function.

Electricity is provided for the electrical distribution system by means of an electrical generator 87 capable of generating a sustained 220 volts over a period of time. In one embodiment, the electrical generator 87 is a gas powered electrical generator.

During normal fire operation liquid propane is pressurized on the towing unit 14 prior to delivery to the quick coupler 27,28. The liquid propane pump 68 is electrically controlled from the central control means. A single pole/single throw switch 88 on the central control means is switched to the "on" position, allowing 110 volts flow to a deadman and safety shut off relay 89 which activates a liquid propane pump "on" indicator light 90 located on the central control means. If the deadman switch 86 or the pull-type switch 85 are activated, the 110 volts flow through the deadman and safety shut off relay 89 to a magnetic switch 91 located on the central control means activating the magnetic switch 91 which in turn allows 220 volts to flow from the electric generator 87 to the liquid propane pump 68. A liquid propane digital meter 92 located on the central control means receives an electrical signal from a pressure transmitter 93 located downstream from the liquid propane pump 68. The electrical signal from the pressure transmitter 93 activates the digital meter 92 resulting in an accurate pressure reading display of the pressure of liquid propane available to the fuel distribution and burner system. In an emergency situation, if the deadman switch 86 or the pull-type switch 85 is tripped, the deadman and safety shut off relay 89 is deactivated resulting in the deactivation of the magnetic switch 91 and the liquid propane pump 68.

During normal fire operation, the fuel distribution and burner systems of each of the five interior burner assemblies 56 are activated by a single pole/single throw switch 94 located on the central control means. Activating the single pole/single throw switch 94 activates a double pole/double throw relay 95 located in the insulated electrical facility 31 causing multiple simultaneous reactions to occur. First, 110 volts of electricity from the central control means energizes a transformer 96 located in the insulated electrical facility 31 as well as an igniter 97 located in the burner assembly 56. Second, an igniter "on" indicator light 98 illuminates on the central control means. Third, 110 volts energize the rack-and-pinion valve 64 on the burner assembly 56 which allows $CO_2$ to charge the rack-and-pinion valve 64 resulting in the rack-and-pinion valve 64 fully opening allowing liquid propane to flow from the servo valve 59 to the burner 66. The servo valve 59 is controlled by a double throw/single pole switch 99 marked "jog open/jog closed" on the central control means. Electrical connection between the central control means, the insulated electrical facility 31, and the metal housing 18 is accomplished by use of a 100 part 20 gauge wire.

The 110 volts that flow to the rack-and-pinion valve 64 will flow only if the deadman switch 86 located at the central control means and the pull-type switch 85 located in the interior of the metal housing 18 are depressed or set to the "on" position. The deadman switch 86 located at the central control means is connected to the pull-type switch 85. When the deadman switch 86 is depressed, or set to the "on" position, and the pull-type switch 85 is set, a double pole/double throw deadman relay 100 located in the insulated electrical facility 31 and the rack-and-pinion valve 70 downstream from the liquid propane tank 67 are both activated. The double pole/double throw deadman relay 100, when activated, allows the 110 volts to flow through the double pole/double throw relay 95 located in the insulated electrical facility 31 to the rack-and-pinion valve 64. The 110 volts flow through the double pole/double throw relay 95 energizing the rack-and-pinion valve 64 on the burner assembly 56 which allows the liquid propane to flow to the burner 66. The rack-and-pinion valve 70 downstream from the liquid propane tank 67, when activated, opens to allow the main supply of liquid propane to flow to the manifold pipe 53 by means of a quick coupler 27,28.

When the double throw/single pole switch 99 marked "jog open/jog closed" is held in the jog open position, the double throw/single pole switch 99 allows 110 volts to flow through the pressure limiter 62 which allows the 110 volts to flow only until a maximum of 25 psi, or other preset pressure, of liquid propane flows through the servo valve 59. The 110 volts flow through the pressure limiter 62 to the servo valve 59 which, if the double pole/single throw switch 99 is held in the jog open position, will continue to open until a maximum of 25 psi of liquid propane flows through the servo valve 59. If the double pole/single throw switch 99 is held in the jog open position momentarily, the servo valve 59 will only open proportionately to the amount of time the double pole/single throw switch 99 is held in the jog open position. The liquid propane pressure in the burner assembly 56 is monitored on a digital meter 101 located on the central control means. When liquid propane is allowed to flow through the servo valve 59, the pressure transmitter 61 sends an electrical signal to the digital meter 101 on the central control means. The electrical signal activates the digital meter 101 resulting in an accurate digital pressure reading display of the flowing liquid propane. To decrease the flow of liquid propane, the double pole/single throw switch 99 is held in the jog closed position until the digital meter 101 reads the desired amount of pressure or no pressure.

To lock-out a particular interior burner assembly 56, the single pole/single throw switch 94 is switched to the lockout position. When the single pole/single throw switch 94 is switched to lockout, the flow of 110 volts is stopped at the single pole/single throw switch 94, which deactivates the double pole/double throw relay 95 located in the insulated electrical facility 31, which results in stoppage of the flow of 110 volts to the rack-and-pinion valve 64, the transformer 96, and the igniter 97, which in turn stops the flow of liquid propane and ignition of the burner 66. In this situation, only the locked-out burner assembly will cease to function, with all other interior burner assemblies 56 functioning normally.

In an emergency, if the deadman switch 86 or the pull-type switch 85 is tripped, the flow of 110 volts to both the rack-and-pinion valve 70 downstream from the liquid propane tank 67 and the rack-and-pinion valves 64 on any open burner assemblies 56 close in less than 1 second resulting in a virtual immediate shut-down of fire throughout the trainer.

During normal fire operations, the fuel distribution and burner systems of each of the exterior burner assemblies and the mock jet engine burner assemblies 57 are activated by a single pole/single throw switch 94 located on the central control means. Activating the single pole/single throw switch 94 activates a double pole/double throw relay 95 located in the insulated electrical facility 31 causing multiple simultaneous reactions to occur. First, 110 volts of electricity from the central control means energizes a transformer 96 located in the insulated electrical facility 31 as well as an igniter 97 located in the burner assembly 57. Second, an igniter "on" indicator light 98 illuminates on the central control means. Third, 110 volts energize the rack-and-pinion valve 64 on the burner assembly 57 which allows $CO_2$ to charge the rack-and-pinion valve 64 resulting in the rack-and-pinion valve 64 fully opening allowing liquid propane to flow from the servo valve 59 to the burner 66. The servo valve 59 is controlled by a double pole/single throw switch 99 marked "jog open/jog closed" on the central control means. Electrical connection between the central control means, the insulated electrical facility 31, and the metal housing 18 is accomplished by use of a 100 part 20 gauge wire. The 110 volts that flow to the rack-and-pinion valve 64 will flow only if the deadman switch 86 located at the central control means and the pull-type switch 85 located in the interior of the metal housing 18 are depressed or set to the "on" position. The deadman switch 86 located at the central control means is connected to the pull-type switch 85. When the deadman switch 86 is depressed, or set to the "on" position, and the pull-type switch 85 is set, a double pole/double throw deadman relay 100 located in the insulated electrical facility 31 and the rack-and-pinion valve 70 downstream from the liquid propane tank 67 are both activated. The double pole/double throw deadman relay 100, when activated, allows the 110 volts to flow through the double pole/double throw relay 95 located in the insulated electrical facility 31 to the rack-and-pinion valve 64. The 110 volts flow through the double pole/ double throw relay 95 energizing the rack-and-pinion valve 64 on the burner assembly 57 which allows the liquid propane to flow to the burner 66. The rack-and-pinion valve 70 downstream from the liquid propane tank 67, when activated, opens to allow the main supply of liquid propane to flow to the manifold pipe 53 by means of a quick coupler 27,28.

When the double pole/single throw switch 99 is held in the jog open position momentarily, the servo valve 59 will only open proportionately to the amount of time the double pole/single throw switch 99 is held in the jog open position. The liquid propane pressure in the burner assembly 57 is monitored on a digital meter 101 located on the central control means. When liquid propane is allowed to flow through the servo valve 59, the pressure transmitter 61 sends an electrical signal to the digital meter 101 on the central control means. The electrical signal activates the digital meter 101 resulting in an accurate digital pressure reading display of the flowing liquid propane. To decrease the flow of liquid propane, the double throw/single pole switch 99 is held in the jog closed position until the digital meter 101 reads the desired amount of pressure or no pressure.

To lock-out a particular exterior or mock jet engine burner assembly 57, the single pole/single throw switch 94 is switched to the lockout position. When the single pole/single throw switch 94 is switched to lockout, the flow of 110 volts is stopped at the single pole/single throw switch 94, which deactivates the double pole/double throw relay 95 located in the insulated electrical facility 31, which results in stoppage of the flow of 110 volts to the rack-and-pinion valve 64, the transformer 96, and the igniter 97, which in turn stops the flow of liquid propane and ignition of the burner 66. In this situation, only the locked-out burner assembly will cease to function, with all other exterior and mock jet engine burner assemblies 57 functioning normally.

In an emergency, if the deadman switch 86 or the pull-type switch 85 is tripped, the flow of 110 volts to both the rack-and-pinion valve 70 downstream from the liquid propane tank 67 and the rack-and-pinion valve 64 on any open burner assembly 57 closes in less than 1 second resulting in a virtual immediate shut-down of fire throughout the trainer.

A blowdown system is built into the burner assembly 57 of the mock jet aircraft engine 49 on the port side. In an emergency, if the deadman 86 or pull-type switch 85 is tripped, a safety shutdown is activated and a pressure buildup of liquid propane throughout the fuel distribution and burner system occurs. The pressure buildup is the highest pressure that was in the fuel distribution and burner system when the safety shut-down was activated. This limiting of pressure occurs because the rack-and-pinion valve 70 on the main flow of liquid propane from the liquid propane tank shuts off immediately when the deadman 86 or pull-type switch 85 is tripped. The buildup of pressure creates an unsafe condition if the burners 66 are reignited without first relieving the pressure. The buildup could cause a surge when the burners 66 are activated, causing an uncontrolled, abrupt ignition of the liquid propane. In a shutdown situation, the blowdown system can be activated either during the shut-down or after the shut-down. In either situation, when a blowdown system switch 105 is activated on the central control means, nine different reactions occur. A double pole/double throw relay switch 106 is activated which in turn activates the transformer 96 which activates the igniter 97, activates the rack-and-pinion valve 64 to fully open, activates a second double pole/double throw relay 107 which activates the servo valve 59 to fully open, causes bypass of the double pole/double throw relay 95 located in the insulated electrical facility 31, activates a blowdown indicator light 108, deactivates a third double pole/double throw relay 109, disables the single pole/single throw switch 94, and disables the double pole/double throw relay 95 located on the insulated electrical facility 31. Since the blowdown system switch 105 is the only activated switch, the main flow of liquid propane is shut off and the liquid propane pump 68 is shut off. This condition allows the fuel distribution and burner system to safely blowdown by burning off through the mock jet engine aircraft 49 on the port side all excess liquid propane trapped in the fuel distribution and burner system as a result of the shut down. Since the mock jet aircraft engine number three 49 on the port side is located in the highest, most out of the way position, the blowdown location is relatively safe, After the excess liquid propane has been burned off, releasing the blowdown system switch 105 will restore the mock jet aircraft engine 49 on the port side to normal operation.

FIGS. 5 and 6 more clearly shows an environmentally safe smoke generating system which is included. The smoke generating system comprises a smoke generator switch 110 and a smoke switch 111 located on the central control means, and a smoke generator 112. When the smoke generator switch 110 is turned "on" 110 volts flow to a magnetic switch 113 located on the metal housing 18, activating the magnetic switch 113 as well as a smoke generator "on" indicator light 114 on the central control means. The magnetic switch 113 in turn allows 220 volts to flow from the electric generator 87 to activate the smoke generator 112 which is located on the metal housing 18. When the now activated smoke generator 112 reaches an appropriate temperature, a thermal switch located inside the smoke generator 112 is tripped which activates a smoke generator "ready" indicator light 116 located on the central control means. A smoke switch 111 marked "no smoke/smoke" is switched to the "smoke" position which allows 110 volts to flow to a piston valve 118 in the smoke generator 112 and activates a smoke "on" indicator light 119 located on the central control means. The activated piston valve 118 allows $CO_2$ to flow to the smoke generator 112 which pressurizes a reservoir containing environmentally safe fuel, such as vegetable oil, and causes the fuel to flow into a heating element in the smoke generator 112 and change into environmentally safe smoke which is then dispersed through the trainer by means of the $CO_2$ pressure.

The central control means comprises a housing 122 which is permanently mounted on the towing unit 14 and has the plurality of manual switches for the electrical distribution system, the plurality of indicator lights, the plurality of digital pressure meters, a relay 89 for the liquid propane pump, and wiring for the switches, lights, and meters, all arrayed in such configuration that the operator has complete access to all switches as well as unobscured vision to all lights and meters at all times while still being able to observe the trailer 11. The plurality of manual switches for the electrical distribution system further comprises seventeen single pole/single throw switches for the burner assemblies 56,57 and one single pole/single throw switch each for the smoke generator 112, the smoke circuit, the liquid propane pump 68, the deadman system, the blowdown system, and the electrical generator 87. The plurality of manual switches for the electrical distribution system further comprises seventeen double pole/single throw switches for the plurality of seventeen burner assemblies 56,57. The plurality of indicator lights further comprises safety indicator lights one each for each of the seventeen burner assemblies 56,57, the smoke generator 112, the smoke circuit, the liquid propane pump 68, the deadman system, the blowdown system, and the electric generator 87. The plurality of digital pressure meters further comprises digital pressure meters one each for each of the seventeen burner assemblies 56,57, the liquid propane pump 68, and the liquid propane tank 67.

The mobile firefighter trainer provides a method for fire simulation response with or without live fire. Trainer operating and training parameters are designed and prepared having a fire growth, fire location and fire spread rate and extinguishment difficulty level predetermined. First location on the trailer and the use of not of smoke are designed and incorporated into the training or evaluation session. Location and placement of the trainer at an airport is predetermined.

The trailer 11 is positioned at the desired location, unhooked from the towing unit 14, and leveled with a jack. The entrance/exit doors 39 are opened and stairs are removed from the cargo compartment 38. The stairs are installed on the entrance/exit doors 39 and pinned into position. A hydraulic ram is removed from the towing unit 14, which hydraulic ram is attached to a hydraulic pump on the towing unit 14. The hydraulic ram is positioned under and in the middle of the port side wing 46 by removing a pin from a lower holding bracket, inserting the hydraulic ram, repinning the hydraulic ram in the lower holding bracket, removing a pin from the upper holding bracket, inserting the other end of the hydraulic ram in the upper holding bracket, repinning the hydraulic ram in the upper holding bracket, removing pins holding the port side wing 46 in an upright position, pulling pins on the two wing struts located one on each side of the port side wing 46 and repinning them into simulation position, lowering the first stage of the port side wing 46 by opening the hand held valve which operates the hydraulic pump on the towing unit 14, and as the port side wing 46 lowers into simulation position, the struts automatically rest on the side of the metal housing 18 when the port side wing 46 is in complete simulation position. The pins securing the hydraulic ram are then removed and the process repeated for the starboard side wing 47. The pins securing the second stages of the wings 46,47 are then pulled and the second stages are lowered by hand. Finally, the pins securing the third stages of the wings 46,47 are pulled and the third stages lowered by hand. The towing unit 14 is then placed in proximity to the tail 48 and the hydraulic ram is attached to the tail 48 and the tail 48 is lifted into place by use of a hand held remote control switch system for the hydraulic ram. When the tail 48 is in the full "up" position, it is pinned into up position and the hydraulic ram is unhooked, removed and the towing unit 14 removed a safe distance from the trailer 11. Liquid propane, $CO_2$ and electrical lines are connected between the metal housing 18 and the tail 48 for the mock jet engines 49,50 located on the tail 48. The remaining mock jet engines 51 are removed from storage inside the metal housing 18, slid onto wing brackets and attached, and liquid propane, $CO_2$ and electrical lines connected to them from the metal housing 18. The wheel shields located on the wheel fenders are unpinned, flipped down and repinned in simulator position.

For live fire simulation, the towing unit 14 is positioned a safe distance from the trailer 11. Fuel, electrical, and $CO_2$ lines are removed from storage on the towing unit 14 and quick coupled to the central control means, the trailer 11, the liquid propane storage tank 67, the $CO_2$ tank 74, and the gas electrical generator 87.

A plurality of individuals are utilized as spotters and fire chiefs. The spotters and fire chiefs utilize headsets for communication during fire simulated response training or evaluation for live fire simulation. The electrical generator 87 is activated and the burner assemblies 56,57 are activated on the trailer 11 where fire is desired. A visual check is gained by the spotters that the burner assemblies 56,57 are functioning. The surrounding area and the trailer 11 are cleared, which clearing is verified by spotters. The preselected burner assemblies 56,57 are reactivated, initiating a fire response simulation. As the fire is appropriately responded to and addressed, the activated burner assemblies 56,57 are adjusted to portray the extinguishment of the fire. Alternatively, the activated burner assemblies 56,57 may be adjusted to simulate a fire that is getting out of control due to poor or inappropriate response by the firefighter.

The set-up steps are reversed to mobilize the trailer 11 for transportation. Upon mobilization, the trailer 11 is configured to be transported to the next simulated aircraft fuel firefighter training or evaluation location.

By using clean burning propane rather than jet fuel, the problem of air pollution and the problem of ground pollution from fuel are minimized. By adjustment at the central control means, the burner assemblies 56,57 in the various preselected areas of fire can be controlled to produce a flame pattern that is responsive in growth and spread to application of extinguishing agents. The trainer permits the evaluation of trainees' performance by monitoring the trainees' extinguishment efforts.

While the invention has been particularly shown and described with reference to a preferred embodiment thereof, it will be understood by those in the art that various changes in the form and details can be made therein without departing from the spirit and scope of the invention.

What is claimed is:

1. A mobile fire fighter trainer comprising:

a substantially rectangular multiple-axle trailer body in the shape of a simulated aircraft;

the substantially rectangular multiple-axle trailer body having a metal frame;

the metal frame having a plurality of three axles and wheels and a hitch;

a metal housing attached to the metal frame having an interior, an exterior, a front, an aft, a top, a bottom, a port side, and a starboard side;

a plurality of four quick couplers, three attached to the hitch, one each for a liquid propane source, an electrical source, and a CO2 source, and one attached on the aft of the metal housing for a liquid,-propane source;

an environmentally safe smoke generating system mounted on the metal housing;

a plurality of two partitions dividing the interior of the metal housing into a plurality of three simulated aircraft compartments, including a cockpit compartment, a passenger compartment, and a cargo compartment;

a plurality of two standard aircraft entrance/exit doors in the metal housing;

a plurality of four standard aircraft emergency exits-/exit doors in the metal housing;

a plurality of ten standard aircraft windows/window frames in the metal housing;

a cargo door mounted in the aft of the metal housing;

a plurality of eight removable aircraft seats attached in a standard aircraft passenger compartment row configuration in the interior in the passenger compartment with a standard aircraft passenger compartment width aisle between the seats;

a plurality of two standard aircraft cockpit seats permanently attached in the cockpit compartment;

a triple-hinged wing attached to the exterior port side of the metal housing;

a triple-hinged wing attached to the exterior starboard side of the metal housing;

a retractable vertical fin tail attached to the aft of the metal housing;

a plurality of two mock jet engines attached to the tail, one each on the port and starboard side;

a plurality of four mock jet engines removably mountable on the wings, two each on the port and starboard wings;

a main extinguishing agent waste drain provided in the metal housing;

a fuel distribution and burner system having an electrical distribution system;

an insulated electrical housing facility mounted in the metal frame for housing a plurality of twenty relays,.a plurality of seventeen transformers, and a series of nineteen wiring circuits of the electrical distribution system and the environmentally safe smoke generating system; and, a central control means connected to the fuel distribution and burner system.

2. The trainer of claim 1 wherein the fuel distribution and burner system further comprises:

a manifold pipe attached to the liquid propane quick coupler which manifold pipe runs the length of the metal housing from front to aft on the bottom exterior of the metal housing;

a plurality of twenty-one T-joints attached to the manifold pipe along the length of the manifold pipe;

a plurality of seventeen burner assemblies attached to the T-joints, with five burner assemblies for the interior of the metal housing and twelve burner assemblies for the exterior of the metal housing and the mock jet engines;

a 500 gallon liquid propane tank mounted on a towing unit;

a liquid propane pump attached to the liquid propane tank;

a 1" rack-and-pinion valve attached to the liquid propane pump;

a 1" LPG 300 psi High Pressure hose attached to the 1" rack-and-pinion valve; and, a 20' length of 1" sch. 80 pipe, which 1" sch. 80 pipe attaches to the liquid propane quick couplers on the metal housing.

3. The trainer of claim 2 wherein the five burner assemblies for the interior of the metal housing each further comprise:

a pipe attached to the T-joint which attaches to the input port of a servo valve;

a pipe attached to the output port of the servo valve which attaches to the input port of a pressure transmitter;

a pressure limiter attached to the pipe between the servo valve and the pressure transmitter;

a pipe attached to the output port of the pressure transmitter which attaches to the input port of a rack-and-pinion valve;

a pipe attached to the output port of the rack-and-pinion valve which attaches to the input port of a burner in the cockpit compartment; and, a pipe attached to the output port of the rack-and-pinion valve which attaches to the input ports of a plurality of two burners in the passenger and cargo compartments, one on each the port and starboard sides.

4. The trainer of claim 2 wherein the twelve burner assemblies for the exterior of the metal housing and the mock jet engines each further comprise:

a pipe attached to the T-joint which attaches to the input port of a servo valve;

a pipe attached to the output port of the servo valve which attaches to the input port of a pressure transmitter;

a pipe attached to the output port of the pressure transmitter which attaches to the input port of a rack-and-pinion valve; and, a pipe attached to the output port of the rack-and-pinion valve which attaches to the input port of a burner.

5. The trainer of claim 2 wherein the fuel distribution and burner system further comprises:
 a pressurized supply of $CO_2$ gas attached to the rack-and-pinion valve of each burner assembly;
 a pressurized $CO_2$ gas storage tank located distant from the trailer body on a towing unit;
 a 3/8" sch. 80 pipe which attaches the pressurized $CO_2$ gas storage tank to a 3/8" double stage high pressure regulator;
 a 3/8" sch. 80 pipe which attaches the double stage high pressure regulator to a high pressure transmitter;
 a 3/8" high pressure hose which attaches the high pressure transmitter to the hitch by means of a 20' length 3/8" sch. 80 pipe that is attached to the high pressure hose and directly to the 3/8" quick coupler on the hitch;
 a $CO_2$ manifold which runs the length of the metal housing from the quick coupler; and,
 a plurality of eighteen T-joints and pipes running from the $CO_2$ manifold to the rack-and-pinion valves on the burner assemblies and an environmentally safe smoke generating system.

6. The trainer of claim 2 wherein the fuel distribution and burner system further comprises:
 an electrical distribution system which controls the fuel distribution and burner system;
 the insulated electrical facility which is attached to the metal frame;
 a plurality of twenty-three electrical distribution wiring circuits in the electrical distribution system;
 a plurality of forty-six sensors in the electrical distribution system;
 a plurality of twenty-one burner igniters in the electrical distribution system; and,
 a deadman system having a pull type switch and a deadman switch in the electrical distribution system.

7. The trainer of claim 6 wherein the electrical distribution system further comprises:
 a single pole/single throw switch located on the central control means which attaches to and activates the fuel distribution and burner systems of the five interior burner assemblies;
 a double pole/double throw relay located in the insulated electrical facility which is activated by the single pole/single throw switch;
 a transformer located in the insulated electrical facility which is energized by the double pole/double throw relay;
 an igniter located in the burner assembly which is energized by the double pole/double throw relay;
 an igniter on indicator light which is activated by the single pole/single throw switch and which illuminates on the central control means;
 the rack-and-pinion valve on the burner assembly which is activated by the double pole/double throw relay;
 a double pole/single throw switch marked jog open/jog closed on the central control means which controls the servo valve;
 a 100 part 20 gauge wire which provides electrical connection between the central control means and the insulated electrical facility;
 an electrical deadman switch located in the central control means;
 a deadman pull-type safety switch located in the interior of the metal housing;
 an electrical connection between the electrical deadman switch located on the central control means and the pull-type deadman safety switch;
 a relay located in the insulated electrical facility and a rack-and-pinion valve on the propane tank which are both activated by the electrical deadman switch and the pull-type deadman safety switch;
 a pressure limiter which activates the fuel distribution and burner systems of the five interior burner assemblies to allow a maximum of 25 psi of liquid propane pressure through the servo valve;
 a digital meter located on the central control means attached to a high pressure transmitter which monitors the liquid propane pressure of each of the fuel distribution and burner systems of the five interior burner assemblies; and,
 a single pole/single throw switch on the central control means marked on/lockout which functions to lock-out a particular burner.

8. The trainer of claim 6 wherein the electrical distribution system further comprises:
 a single pole/single throw switch which is located on the central control means and attaches to and activates the fuel distribution and burner systems of the exterior and mock jet engine burner assemblies during normal fire operation;
 a double pole/double throw relay located in the insulated electrical facility which is activated by the single pole/single throw switch;
 a transformer located in the insulated electrical facility which is energized by the double pole/double throw relay;
 an igniter located in the burner assembly which is energized by the double pole/double throw relay;
 an igniter on indicator light which is activated by the single pole/single throw switch and which illuminates on the central control means;
 the rack-and-pinion valve on the burner assembly which is activated by the double pole/double throw relay;
 a double pole/single throw switch marked jog open/jog closed on the central control means which controls the servo valve;
 a 100 part 20 gauge wire which provides electrical connection between the central control means and the insulated electrical facility;
 an electrical deadman switch located in the central control means;
 a deadman pull-type safety switch located in the interior of the metal housing;
 an electrical connection between the electrical deadman switch located on the central control means and the pull-type deadman safety switch;
 a relay located in the insulated electrical facility and a rack-and-pinion valve on the propane tank which are both activated by the electrical deadman switch and the pull-type deadman safety switch;
 a digital meter located on the central control means attached to a high pressure transmitter which monitors the liquid propane pressure of each of the fuel distribution and burner systems of the exterior and mock jet engine burner assemblies; and, a single pole/single throw switch on the central control means marked on/lockout which functions to lock-out a particular burner.

9. The trainer of claim 6 wherein the electrical distribution system further comprises:
- a blowdown system switch on the central control means;
- a first double pole/double throw relay which is activated by the blowdown system switch;
- a transformer which is activated by the first double pole/double throw relay which activates an igniter;
- a rack-and-pinion valve which is activated to fully open by the first double pole/double throw relay;
- a second double pole/double throw relay which is activated by the first double pole/double throw relay;
- a servo valve which is activated to fully open by the second double pole/double throw relay;
- a double pole/double throw relay located in the insulated electrical facility is bypassed by reason of the activation of the first double pole/double throw relay switch;
- a n blowdown indicator light which is activated by the first double pole/double throw relay;
- a third double pole/double throw relay which is deactivated by the first double pole/double throw relay;
- an on/lockout switch which is deactivated by the first double pole/double throw relay; and,
- a normal operations relay which is disabled by the first double pole/double throw relay.

10. The trainer of claim 6 wherein the electrical distribution system further comprises:
- a single pole/single throw switch located on the central control means which controls the liquid propane pump;
- a liquid propane pump on indicator light located on the central control means;
- a magnetic switch located on the central control means which activates the liquid propane pump;
- a liquid propane digital meter located on the central control means attached to a pressure transmitter; and,
- a pressure transmitter located in the liquid propane pipe downstream from the liquid propane pump.

11. The trainer of claim 2 wherein the central control means connected to the fuel distribution and burner system further comprises:
- a housing which is permanently mounted on a towing unit;
- a plurality of forty manual switches mounted in the housing for the electrical distribution system;
- a plurality of twenty-three indicator lights mounted in the housing;
- a plurality of nineteen digital pressure meters mounted in the housing; and,
- a relay mounted in the housing for a liquid propane pump.

12. The trainer of claim 11 wherein the plurality of manual switches mounted in the housing for the electrical distribution system further comprises:
- a plurality of seventeen single pole/single throw switches for the burner assemblies;
- a single pole/single throw switch for the smoke generator on/off circuit;
- a single pole/single throw switch for the smoke on/off circuit;
- a single pole/single throw switch for the liquid propane pump on/lockout circuit;
- a single pole/single throw switch for the deadman on/off circuit;
- a single pole/single throw switch for the emergency blowdown on/off circuit;
- a single pole/single throw switch for the electrical generator on/off/start circuit; and,
- a plurality of seventeen double pole/single throw switches for the burner assemblies.

13. The trainer of claim 1 wherein the environmentally safe smoke generating system further comprises:
- a smoke generator on/off switch located on the central control means;
- a magnetic switch located on the metal housing which is activated by the smoke generator on/off switch;
- a smoke generator on indicator light on the central control means which is activated by the smoke generator on/off switch;
- a smoke generator located on the metal housing which is activated by the magnetic switch;
- a thermal switch located inside the smoke generator;
- a smoke generator indicator light located on the central control means which is activated by the smoke generator;
- a smoke generator smoke switch marked no smoke/smoke located on the central control means;
- a piston valve which is activated by the smoke generator smoke switch; and,
- a reservoir containing environmentally safe fuel which is controlled by the piston valve.

14. A method of training firefighters comprising the steps of:
- providing a mobile fire fighter trainer comprising a substantially rectangular multiple-axle trailer body in the shape of a simulated aircraft;
- the substantially rectangular multiple-axle trailer body having a metal frame;
- the metal frame having a plurality of three axles and wheels and a hitch;
- a metal housing attached to the metal frame having an interior, an exterior, a front, an aft, a top, a bottom, a port side, and a starboard side;
- a plurality of four quick couplers, three attached to the hitch, one each for a liquid propane source, an electrical source, and a CO2 source, and one attached to the aft of the metal housing for a liquid propane source;
- an environmetnally safe smoke generating system mounted on the metal housing;
- a plurality of two partitions dividing the interior of the metal housing into a plurality of three simulated aircraft compartments, including a cockpit compartment, a passenger compartment, and a cargo compartment;
- a plurality of two standard aircraft entrance/exit doors in the metal housing;
- a plurality of four standard aircraft emergency exits/exit doors in the metal housing;
- a plurality of ten standard aircraft windows/window frames in the metal housing;
- a cargo door mounted in the aft of the metal housing;
- a plurality of eight removable aircraft seats attached in a standard aircraft passenger compartment row configuration in the interior in the passenger compartment with a standard aircraft passenger compartment width aisle between the seats;

a plurality of two standard aircraft cockpit seats permanently attached in the cockpit compartment;

a triple-hinged wing attached to the exterior port side of the metal housing;

a triple-hinged wing attached to the exterior starboard side of the metal housing;

a retractable vertical fin tail attached to the aft of the metal housing;

a plurality of two mock jet engines atached to the tail, one each on the port and starboard side;

a plurality of four mock jet engines removably mountable on the wings, two each on the port and starboard wings;

a main extinguishing agent waste drain provided in the metal housing;

a fuel distribution and burner system having an electrical distribution system;

an insulated electrical housing facility mounted in the metal frame for housing a plurality of twenty relays, a plurality of seventeen transformers, and a series of nineteen wiring circuits of the electrical distribution system and the environmetnally safe smoke generating system; and, a central control means connected to the fuel distribution and burner system;

designing and preparing trainer operating and training parameters having a fire growth and spread rate and entinguishment difficulty predetermined;

activating the fuel distribution and burner system by means of the central control means;

directing firefighters in the appropriate response to the fire; and adjusting the fuel distribution and burner system by means of the central control means as the appropriate response is made to the fire.

15. The method of claim 14 wherein said fuel distribution and burner system further comprises:

a manifold pipe attached to the liquid propane quick coupler which manifold pipe runs the length of the metal housing from front to aft on the bottom exterior of the metal housing;

a plurality of twenty-one T-joints attached to the manifold pipe along the length of the manifold pipe;

a plurality of seventeen burner assemblies attached to the T-joints, with five burner assemblies for the interior of the metal housing and twelve burner assemblies for the exterior of the metal housing and the mock jet engines;

a 500 gallon liquid propane tank mounted on a towing unit;

a liquid propane pump attached to the liquid propane tank;

a 1" rack-and-pinion valve attached to the liquid propane pump;

a 1" LPG 300 psi High Pressure hose attached to the 1" rack-and-pinion valve; and, a 20' length of 1" sch. 80 pipe, which 1" sch. 80 pipe attaches to the liquid propane quick couplers on the metal housing.

16. The method of claim 15 wherein the five burner assemblies for the interior of the metal housing each further comprise:

a pipe attached to the T-joint which attaches to the input port of a servo valve;

a pipe attached to the output port of the servo valve which attaches to the input port of a pressure transmitter;

a pressure limiter attached to the pipe between the servo valve and the pressure transmitter;

a pipe attached to the output port of the pressure transmitter which attaches to the input port of a rack-and-pinion valve;

a pipe attached to the output port of the rack-and-pinion valve which attaches to the input port of a burner in the cockpit compartment; and, a pipe attached to the output port of the rack-and-pinion valve which attaches to the input ports of a plurality of two burners in the passenger and cargo compartments, one on each the port and starboard sides.

17. The method of claim 15 wherein the twelve burner assemblies for the exterior of the metal housing and the mock jet engines each further comprise:

a pipe attached to the T-joint which attaches to the input port of a servo valve;

a pipe attached to the output port of the servo valve which attaches to the input port of a pressure transmitter;

a pipe attached to the output port of the pressure transmitter which attaches to the input port of a rack-and-pinion valve; and, a pipe attached to the output port of the rack-and-pinion valve which attaches to the input port of a burner.

18. The method of claim 15 wherein the fuel distribution and burner system further comprises:

a pressurized supply of $CO_2$ gas attached to the rack-and-pinion valve of each burner assembly;

a pressurized $CO_2$ gas storage tank located distant from the trailer body on a towing unit;

a 3/8" sch. 80 pipe which attaches the pressurized $CO_2$ gas storage tank to a 3/8" double stage high pressure regulator;

a 3/8" sch. 80 pipe which attaches the double stage high pressure regulator to a high pressure transmitter;

a 3/8" high pressure hose which attaches the high pressure transmitter to the hitch by means of a 20' length 3/8" sch. 80 pipe that is attached to the high pressure hose and directly to the 3/8" quick coupler on the hitch;

a $CO_2$ manifold which runs the length of the metal housing from the quick coupler; and, a plurality of eighteen T-joints and pipes running from the $CO_2$ manifold to the rack-and-pinion valves on the burner assemblies and an environmentally safe smoke generating system.

19. The method of claim 15 wherein the fuel distribution and burner system further comprises:

an electrical distribution system which controls the fuel distribution and burner system;

the insulated electrical facility which is attached to the metal frame;

a plurality of twenty-three electrical distribution wiring circuits in the electrical distribution system;

a plurality of forty-six sensors in the electrical distribution system;

a plurality of twenty-one burner igniters in the electrical distribution system; and, a deadman system having a pull type switch and a deadman switch in the electrical distribution system.

20. The method of claim 19 wherein the electrical distribution system further comprises:

a single pole/single throw switch located on the central control means which attaches to and activates the fuel distribution and burner systems of the five interior burner assemblies;

a double pole/double throw relay located in the insulated electrical facility which is activated by the single pole/single throw switch;

a transformer located in the insulated electrical facility which is energized by the double pole/double throw relay;

an igniter located in the burner assembly which is energized by the double pole/double throw relay;

an igniter on indicator light which is activated by the single pole/single throw switch and which illuminates on the central control means;

the rack-and-pinion valve on the burner assembly which is activated by the double pole/double throw relay;

a double pole/single throw switch marked jog open/jog closed on the central control means which controls the servo valve;

a 100 part 20 gauge wire which provides electrical connection between the central control means and the insulated electrical facility;

an electrical deadman switch located in the central control means;

a deadman pull-type safety switch located in the interior of the metal housing;

an electrical connection between the electrical deadman switch located on the central control means and the pull-type deadman safety switch;

a relay located in the insulated electrical facility and a rack-and-pinion valve on the propane tank which are both activated by the electrical deadman switch and the pull-type deadman safety switch;

a pressure limiter which activates the fuel distribution and burner systems of the five interior burner assemblies to allow a maximum of 25 psi of liquid propane pressure through the servo valve;

a digital meter located on the central control means attached to a high pressure transmitter which monitors the liquid propane pressure of each of the fuel distribution and burner systems of the five interior burner assemblies; and, a single pole/single throw switch on the central control means marked on/lockout which functions to lock-out a particular burner.

21. The method of claim 19 wherein the electrical distribution system further comprises:

a single pole/single throw switch which is located on the central control means and attaches to and activates the fuel distribution and burner systems of the exterior and mock jet engine burner assemblies during normal fire operation;

a double pole/double throw relay located in the insulated electrical facility which is activated by the single pole/single throw switch;

a transformer located in the insulated electrical facility which is energized by the double pole/double throw relay;

an igniter located in the burner assembly which is energized by the double pole/double throw relay;

an igniter on indicator light which is activated by the single pole/single throw switch and which illuminates on the central control means;

the rack-and-pinion valve on the burner assembly which is activated by the double pole/double throw relay;

a double pole/single throw switch marked jog open/jog closed on the central control means which controls the servo valve;

a 100 part 20 gauge wire which provides electrical connection between the central control means and the insulated electrical facility;

an electrical deadman switch located in the central control means;

a deadman pull-type safety switch located in the interior of the metal housing;

an electrical connection between the electrical deadman switch located on the central control means and the pull-type deadman safety switch;

a relay located in the insulated electrical facility and a rack-and-pinion valve on the propane tank which are both activated by the electrical deadman switch and the pull-type deadman safety switch;

a digital meter located on the central control means attached to a high pressure transmitter which monitors the liquid propane pressure of each of the fuel distribution and burner systems of the exterior and mock jet engine burner assemblies; and, a single pole/single throw switch on the central control means marked on/lockout which functions to lock-out a particular burner.

22. The method of claim 19 wherein the electrical distribution system further comprises:

a blowdown system switch on the central control means;

a first double pole/double throw relay which is activated by the blowdown system switch;

a transformer which is activated by the first double pole/double throw relay which activates an igniter;

a rack-and-pinion valve which is activated to fully open by the first double pole/double throw relay;

a second double pole/double throw relay which is activated by the first double pole/double throw relay;

a servo valve which is activated to fully open by the second double pole/double throw relay;

a double pole/double throw relay located in the insulated electrical facility is bypassed by reason of the activation of the first double pole/double throw relay switch;

a blowdown indicator light which is activated by the first double pole/double throw relay;

a third double pole/double throw relay which is deactivated by the first double pole/double throw relay;

an on/lockout switch which is deactivated by the first double pole/double throw relay; and, a normal operations relay which is disabled by the first double pole/double throw relay.

23. The method of claim 19 wherein the electrical distribution system further comprises:

a single pole/single throw switch located on the central control means which controls the liquid propane pump;

a liquid propane pump on indicator light located on the central control means;

a magnetic switch located on the central control means which activates the liquid propane pump;

a liquid propane digital meter located on the central control means attached to a pressure transmitter; and, a pressure transmitter located in the liquid propane pipe downstream from the liquid propane pump.

24. The method of claim 23 wherein the plurality of manual switches mounted in the housing for the electrical distribution system further comprises:
- a plurality of seventeen single pole/single throw switches for the burner assemblies;
- a single pole/single throw switch for the smoke generator on/off circuit;
- a single pole/single throw switch for the smoke on/off circuit;
- a single pole/single throw switch for the liquid propane pump on/lockout circuit;
- a single pole/single throw switch for the deadman on/off circuit;
- a single pole/single throw switch for the emergency blowdown on/off circuit;
- a single pole/single throw switch for the electrical generator on/off/start circuit; and,
- a plurality of seventeen double pole/single throw switches for the burner assemblies.

25. The method of claim 15 wherein the environmentally safe smoke generating system further comprises:
- a smoke generator on/off switch located on the central control means;
- a magnetic switch located on the metal housing which is activated by the smoke generator on/off switch;
- a smoke generator on indicator light on the central control means which is activated by the smoke generator on/off switch;
- a smoke generator located on the metal housing which is activated by the magnetic switch;
- a thermal switch located inside the smoke generator;
- a smoke generator indicator light located on the central control means which is activated by the smoke generator;
- a smoke generator smoke switch marked no smoke/smoke located on the central control means;
- a piston valve which is activated by the smoke generator smoke switch; and,
- a reservoir containing environmentally safe fuel which is controlled by the piston valve.

26. The method of claim 15 wherein the central control means connected to the fuel distribution and burner system further comprises:
- a housing which is permanently mounted on a towing unit;
- a plurality of forty manual switches mounted in the housing for the electrical distribution system;
- a plurality of twenty-three indicator lights mounted in the housing;
- a plurality of nineteen digital pressure meters mounted in the housing; and,
- a relay mounted in the housing for a liquid propane pump.

\* \* \* \* \*